Patented Dec. 11, 1928.

1,694,710

UNITED STATES PATENT OFFICE.

NILS ERIK LENANDER, OF LOKKEN VERK, NORWAY, ASSIGNOR TO ORKLA GRUBE-AKTIEBOLAG, OF LOKKEN VERK, NORWAY.

PROCESS FOR THE RECOVERY OF ZINC FROM ZINC-BEARING SOLUTIONS.

No Drawing. Application filed June 9, 1926, Serial No. 114,828, and in Norway May 22, 1925.

The invention has for its object a process for the treatment of zinc-chloride-bearing solutions for recovering the zinc contents in the form of oxide zinc compounds.

The process is particularly intended for the treatment of the kind of zinc-bearing waste lyes which are obtained in copper extracting plants, but it may be utilized advantageously for zinc-bearing solutions of any other origin.

A considerable work has been made for the recovery of zinc from the waste lyes mentioned above, but, hitherto, these attempts have not matured into results which can be considered satisfactory in technical as well as economical respects.

In a process previously proposed zinc hydroxide is precipitated by means of lime (for instance by the addition of milk of lime). In the manner, wherein one has tried to effect this precipitation hitherto, it has not been possible to avoid the precipitation with the zinc hydroxide already precipitated of zinc chloride as basic zinc chlorides which are insoluble in water.

However, these basic zinc chlorides may be converted by lime by heating to boiling, and in this manner a product technically free from chlorine can be obtained. This process requires a long time of heating and a comparatively great excess of lime which decreases the value of the final product. It has been proposed to effect the precipitation with lime at low temperatures, about 0° C., in order to avoid in this manner the formation of basic zinc chlorides, but thereby a very finely divided slimy precipitate is obtained, the filtering or sedimentation of which for the purpose of separation from the mother lye is practically unfeasible. By the present invention it is made possible in a cheap and simple manner to manufacture a final product rich in zinc and very poor in contaminations.

The present process comprises in combination the steps of adding to the solution an amount of lime less than that required to convert the zinc content into zinc hydroxide, removing the resulting precipitate comprising basic zinc chlorides from the mother lye, mixing the precipitate with an amount of lime which is not greater than the equivalent to the basic zinc chlorides, and heating the mixture at atmospheric pressure to a temperature not above about 70° C., whereby the zinc hydrate of the reaction product is converted into zinc oxide.

As is known, the common salt used in chlorinating roasting of ores contains most frequently, although not always, some chloride of magnesium.

In the lime-precipitation as it is usually proposed to be carried out (with excess or at all events with an equivalent amount of lime), the said magnesium will fall out together with the zinc compound and contaminate the same. This is avoided if an amount of lime less than the equivalent one is added for the precipitation, whereby magnesium is maintained in solution and may be easily removed together with the mother lye. When a deficient amount of lime is used, it is further obtained that insoluble basic calcium chlorides are not formed in large quantities. Even if the amount of lime thus added to the solution is less than that required to convert the zinc content to hydroxide, the zinc will be precipitated completely, because basic chlorides are formed. The precipitation is preferably effected at so high a temperature, for instance 30–40° C., that a heavy and easily filtrable precipitate is formed. A precipitate is thereby obtained that may be separated comparatively easily from the mother lye by filtration or sedimentation.

After the mother lye has been removed and replaced completely or partly by water, it is possible to convert the basic zinc chlorides by lime. However, a practically complete conversion requires a long time and an excess of lime requires a high temperature and most frequently a repeated treatment. But such a complete conversion is not necessary nor is it intended by the present process. The purpose is not to add so much lime or excess of lime that a product technically free from chlorine is formed. It is preferred to manufacture a product with a very small or no excess of lime and containing so much chlorine that the latter may act during the later sintering or melting for the expulsion of easily volatile metal chlorides such as cadmium chloride.

As it is known, zinc is precipitated by lime as zinc hydrate, if the precipitation is effected at ordinary temperature. If the precipitation is effected at a high temperature or if the precipitate is subsequently heated to for instance 70–80° C., the zinc hydrate is dissociated and converted into oxide, whereby is obtained a precipitate occupying a far less volume and becoming easily filtrable. As the reaction of basic zinc chlorides with lime takes place more quickly the higher the temperature that is used, it has been found suitable to effect this reaction simultaneously with the conversion of the zinc hydrate into oxide.

It might seem advantageous to remove from the precipitate all chlorine soluble for example in the form of calcium chloride. Thereby a precipitate is obtained which by drying and after a subsequent sintering falls easily down into powder and causes great losses by dust-formation. This does not take place, if small amounts of calcium chloride solution remain in the precipitate, because this solution acts in such case as a binder. In this manner the losses can be so reduced as to be inappreciable.

In heating the precipitate for the purpose of expelling chlorine, the result is highly dependent upon the excess of lime, because a precipitation with a large excess of lime requires so high a temperature for the said expulsion that it is difficult to obtain such a temperature in suitable apparatus. But if the treatment is effected with a small or no excess of lime, the process may easily be carried out at for instance 1000–1200°, and thereby a sintering of the mass takes place, and chlorine and sulphur which might occur may be removed completely or to such an extent that only a negligible and harmless amount remains.

As regards the value of the zinc product for the further treatment with a view to obtain saleable zinc products it is of importance that contaminations, particularly cadmium, be not present. If one now works with a precipitate with a relatively high content of chlorine, easily volatile contaminations, particularly cadmium, will be volatilized in the form of chloride and may be collected, together with over-distilled zinc chloride, in devices suitable for this purpose.

By the process described above it is possible to undertake the whole treatment of both the solutions and the precipitates in open vessels under ordinary pressure.

I claim—

1. A process of treating metal salt solutions containing in addition to zinc chloride also some magnesium salt, comprising in combination the steps of adding to the solution an amount of lime less than that required to convert the zinc contents into zinc hydroxide, removing the resulting precipitate comprising basic zinc chlorides from the mother lye, mixing the precipitate with an amount of lime which is not greater than that equivalent to the basic zinc chlorides, and heating the mixture at atmospheric pressure to a temperature not above about 70° C., whereby the zinc hydrate of the reaction product is converted into zinc oxide.

2. A process according to claim 1 in combination with the step of drying the resulting oxide zinc compound in the presence of such calcium chloride as remains as a result of the reaction between lime and basic zinc chloride and heating the product to a temperature above that at which the mixture begins to sinter.

3. A process according to claim 1 in which the resulting oxide zinc compound is heated to a temperature above that at which the mixture begins to sinter in the presence of a proportion of metal chloride sufficient to form chloride with cadmium and other metals with readily volatile chlorides, present as impurities.

In testimony whereof I have signed my name to this specification.

NILS ERIK LENANDER.